United States Patent
Malki et al.

(10) Patent No.: US 7,510,167 B2
(45) Date of Patent: Mar. 31, 2009

(54) ISOLATION DAMPER AND METHOD OF FORMING AIRTIGHT SEAL

(75) Inventors: Timothy E. Malki, Palm Springs, CA (US); Daniel R. Olson, Irvine, CA (US)

(73) Assignee: Daniel Environmental, Co. LLC, Los Angeles, CA (US)

( * ) Notice: Subject to any disclaimer, the term of this patent is extended or adjusted under 35 U.S.C. 154(b) by 0 days.

(21) Appl. No.: 11/122,130

(22) Filed: May 3, 2005

(65) Prior Publication Data

US 2005/0242317 A1 Nov. 3, 2005

Related U.S. Application Data

(60) Provisional application No. 60/567,913, filed on May 3, 2004.

(51) Int. Cl.
*F16K 5/00* (2006.01)
(52) U.S. Cl. .................. 251/317; 251/304; 251/308; 251/314
(58) Field of Classification Search .............. 251/304, 251/306, 314, 316, 317, 308
See application file for complete search history.

(56) References Cited

U.S. PATENT DOCUMENTS

| | | | |
|---|---|---|---|
| 3,233,861 A * | 2/1966 | Stillwagon | 251/148 |
| 3,361,157 A * | 1/1968 | Schach | 137/489 |
| 4,241,748 A | 12/1980 | McCabe | |
| 4,844,116 A * | 7/1989 | Buehler et al. | 137/360 |
| 4,917,350 A | 4/1990 | Beyer et al. | |
| 5,234,193 A * | 8/1993 | Neal et al. | 251/175 |
| 5,295,659 A * | 3/1994 | Steele | 251/173 |
| 5,388,806 A * | 2/1995 | Kusmer et al. | 251/306 |
| 5,741,180 A | 4/1998 | Xia et al. | |
| 5,876,015 A | 3/1999 | Schaeffer et al. | |
| 6,123,319 A | 9/2000 | Maxwell | |
| 6,142,173 A * | 11/2000 | Bekeredjian et al. | 137/375 |
| 6,254,104 B1 * | 7/2001 | Hafner | 277/590 |
| 6,557,826 B2 | 5/2003 | Moore et al. | |

OTHER PUBLICATIONS

Notification of Transmittal, International Search Report and Written Opinion in PCT Application No. PCT/US05/15420, Mar. 5, 2005.

* cited by examiner

*Primary Examiner*—John K Fristoe, Jr.
(74) *Attorney, Agent, or Firm*—Bingham McCutchen LLP

(57) ABSTRACT

An isolation damper capable of forming an airtight or zero-leakage seal. The damper includes an annular frame or frame and a flexible seal member that extends around an inner surface of the frame. The seal member is at least partially embedded or integrated into the frame and includes an exposed surface. The seal member can be a single or multi-component seal member. A rotatable shaft extends across the interior annular aperture of the annular frame, and a blade is coupled to the shaft. The blade that is attached to the shaft is rotatable between closed and open positions. An outer circumferential edge of the blade engages the exposed surface of the seal member when the blade is rotated to a closed position thereby forming an air tight seal.

42 Claims, 8 Drawing Sheets

Relaxed

Compressed

FROM HIGH (1) TO LOW (3) DUROMETER

ISOLATION DAMPER AND METHOD OF FORMING AIRTIGHT SEAL

CROSS REFERENCE TO RELATED APPLICATION(S)

This application claims the benefit under 35 U.S.C. §119 of U.S. Provisional Application No. 60/567,913, filed May 3, 2004, the contents of which are hereby incorporated herein by reference.

FIELD OF THE INVENTION

The present invention relates to devices that are used to regulate delivery of air and isolation systems, more particularly, to isolation dampers capable of forming an airtight or zero-leakage seal using a flexible sealing member.

BACKGROUND

Dampers have been used for many years to regulate the amount of air that flows through an air delivery or distribution system. In some applications, dampers are used to regulate or block airflows containing pollutants, chemicals, contaminants and other hazardous materials. To be effective, particularly in clean environments, dampers must block all of the hazardous airflows to ensure that workers or customers are not exposed to harmful materials, which can lead to serious health problems and possibly death.

One known damper includes an annular frame, a circular blade or a pair of semi-circular "butterfly" blades, and an annular, rigid backstop. An elastomer material is attached to an outer portion of a face of the damper blade. The annular backstop or ridge extends inwardly from the inner surface of the frame and into the aperture defined by the frame, i.e., into the path of the airflow. The backstop is provided for sealing purposes and to limit the rotation of the circular blade. When the blade is rotated to close the damper, the material attached to the face of blade hits the backstop. In other words, a seal is formed by rotating the blade, thereby pressing the elastomer material between the face of the blade and the backstop. Thus, the backstop is an integral component with certain known dampers. Without the backstop, the blade may rotate beyond the intended stopping point and a seal would not be formed.

These types of dampers have a number of shortcomings in their design and isolation capabilities, particularly when used to block airflows having pollutants, contaminants and other hazardous materials. The effectiveness of a damper that relies on forming a seal with radial pressure or rotational force to push the blade and seal material against the backstop depends on a number of factors.

For example, a damper that uses a conventional wiper-type seal configuration typically requires more complicated components and techniques to attach the wiper seal component to the damper blade. Further, a wiper configuration is typically less effective since there can be problems resulting from the seal detaching from the blade. Additionally, a circular blade having a wiper-type seal attached thereto and backstop components must be manufactured to precise tolerances so that the seal material attached to the blade and the upstanding backstop consistently sealingly mate with each other to form a seal. The backstop and the blade seal may not properly mate with each other if the outer annular sections of the blade and the sealing ridge are not properly designed within the required tolerances. These problems can result in leaks that contain harmful materials, small amounts of which can be problematic. Additionally, traditional damper designs do not optimize air flow when the damper is open. More specifically, when the damper is open, the ridge or backstop extending inwardly from the inner frame surface extends into the path of the airflow, thereby inhibiting air flow.

Other known dampers utilize an integrally formed roll formed aluminum sealing ridge. The aluminum ridge extends around the inner surface of the damper frame. A seal is formed by an outer edge of a blade contacting the aluminum roll formed ridge. These dampers, however, do not provide adequate seals, particularly when air tight seals are required. For example, the resulting seal can be improved since the outer edge of a metal blade interfaces with a ridged metal material). Minor manufacturing variations can cause leaks through these "metal on metal" seals.

Accordingly, there exists a need for an isolation damper that can reliably provide an air tight or zero-leakage seal to effectively block harmful or dangerous air flows when the damper is closed, and that improves airflow when the damper is open.

SUMMARY

In accordance with one embodiment, an isolation damper includes an annular frame, a flexible seal member, and a blade. The annular frame defines an interior aperture and has an inner annular surface. The flexible seal member extends around the inner annular surface of the frame. A blade is coupled to a rotatable shaft that extends across the interior aperture of the frame so that the blade can be rotated within the frame between open and closed positions. An outer circumferential edge of the blade sealingly engages the flexible seal member when the blade is in the closed position, thereby forming a seal.

In accordance with a further embodiment is an isolation damper that can form a zero-leakage air-tight seal. The damper includes an annular frame, a flexible seal member, and a blade. The annular frame defines an interior aperture and has an inner annular surface. The flexible seal member extends around the inner annular surface of the frame and can assume both relaxed and compressed states. A blade is coupled to a rotatable shaft that extends across the interior aperture of the frame so that the blade can be rotated within the frame between open and closed positions. An outer circumferential edge of the blade compresses and sealingly engages the flexible seal member when the blade is in the closed position, thereby forming an air-tight seal.

In yet a further embodiment, an isolation damper capable of forming a zero-leakage air-tight seal includes an annular frame, a multi-component flexible seal member and a blade. The multi-component flexible seal member extends around the inner annular surface of the annular frame and can be relaxed or compressed. According to one embodiment, the multi-component seal includes first and second seal member components. The first seal member component is partially embedded within the annular frame and has an exposed surface. The second seal member component is completely embedded within the annular frame. An outer circumferential edge of the blade sealingly engages the exposed surface of the first seal member component when the blade is in the closed position and compresses the flexible seal member to form an air-tight seal.

In a further alternative embodiment is a method of forming a zero-leakage air tight seal in an isolation damper. The method includes providing an annular frame and a blade that is coupled to a rotatable shaft. The annular frame defines an interior aperture and has an inner annular surface. The blade is rotatable between open and closed positions. The method also includes installing a flexible seal member around the inner annular surface of the annular frame so that an outer circumferential edge of the blade sealingly engages the flexible seal member when the blade is in the closed position, thereby forming the air tight seal.

In various embodiments, the outer circumferential edge of the blade can compress the flexible seal member with increasing force as the blade is moved from a position in which the outer circumferential edge initially contacts the flexible seal member to the closed position. The resulting seal can withstand a pressure of about 30 w.g.

Further, in various embodiments, the flexible seal member is an elastomer, such as silicone. The seal material can be resilient so that it returns to its original shape after being compressed by the blade. The shape and size of the flexible seal member that is applied to the inner annular surface of the damper can be selected depending on the shape and size of the damper. For example, the flexible seal member can have a thickness of about ¼" to about 4", a width of about 9/16" to about 12" and can cover about 10-90%, of the surface area of the inner annular surface of the annular frame. When the flexible sealing material is compressed in the closed state, the thickness of the sealing material can be about 1-95% of its original thickness, or the thickness in a relaxed state.

Moreover, in various embodiments, the blade can be a unitary body made of a fiberglass reinforced plastic material, and can have an elliptical shape. For example, the blade can have a degree of ellipticity from about 0.1% to about 10%. Unlike conventional dampers, embodiments do not require an annular frame that has a backstop in view of the outer edge of the blade engaging and stopping on the flexible material to form a seal.

Additionally, in various embodiments, the flexible seal member can have multiple components. For example, a seal can have two seal member components. At least a portion of the first seal member component is partially embedded in the frame and has an exposed surface that is contacted by an outer edge of the blade, whereas the second seal member component is completely embedded within the annular frame and is covered by the first seal member component. The lateral edges of the first seal member component are inserted into corresponding interior grooves defined by the annual frame. The seal member components can have different physical characteristics. For example, the first seal member component can be harder than the second seal member, but less flexible than the second seal member component.

Further, when a flexible seal member is a single component, the durometer value of the seal material can vary across its thickness so that a durometer value of a portion of the flexible seal member that is embedded within the annular frame is less than a durometer value of a portion of an exposed portion of the flexible seal member. For example, the durometer values may be graduated or vary in intervals, and the durometer values may increase according to a function, e.g., linearly and exponentially. Further, the flexible seal member can include an air pocket. In a multiple component flexible seal, the air pocket can be formed in the outer component that has an exposed surface. A flexible seal member having an air pocket can also have varying durometer values.

BRIEF DESCRIPTION OF THE DRAWINGS

Referring now to the drawings, in which like reference numbers represent corresponding parts throughout, and in which.

DETAILED DESCRIPTION OF ILLUSTRATED EMBODIMENTS

Figure 1:
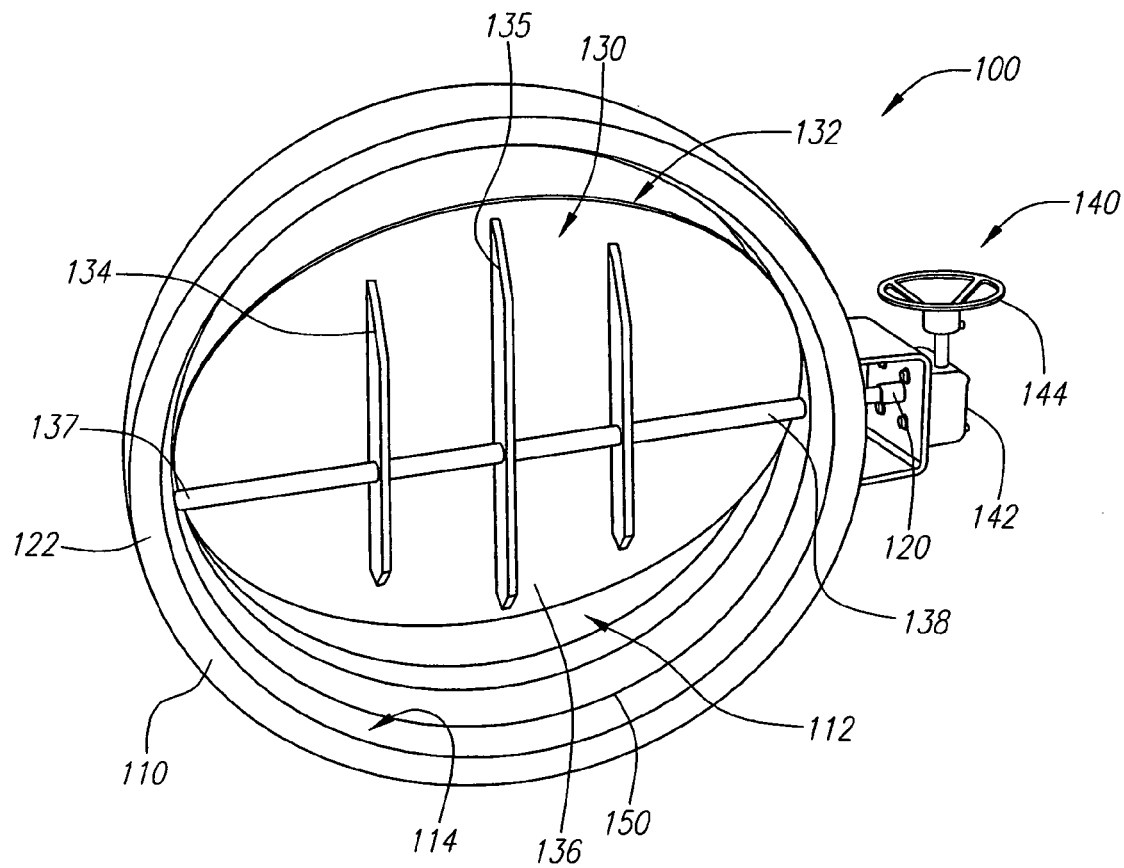
FIG. 1 is a perspective view of an isolation damper according to one embodiment.
Figure 2:
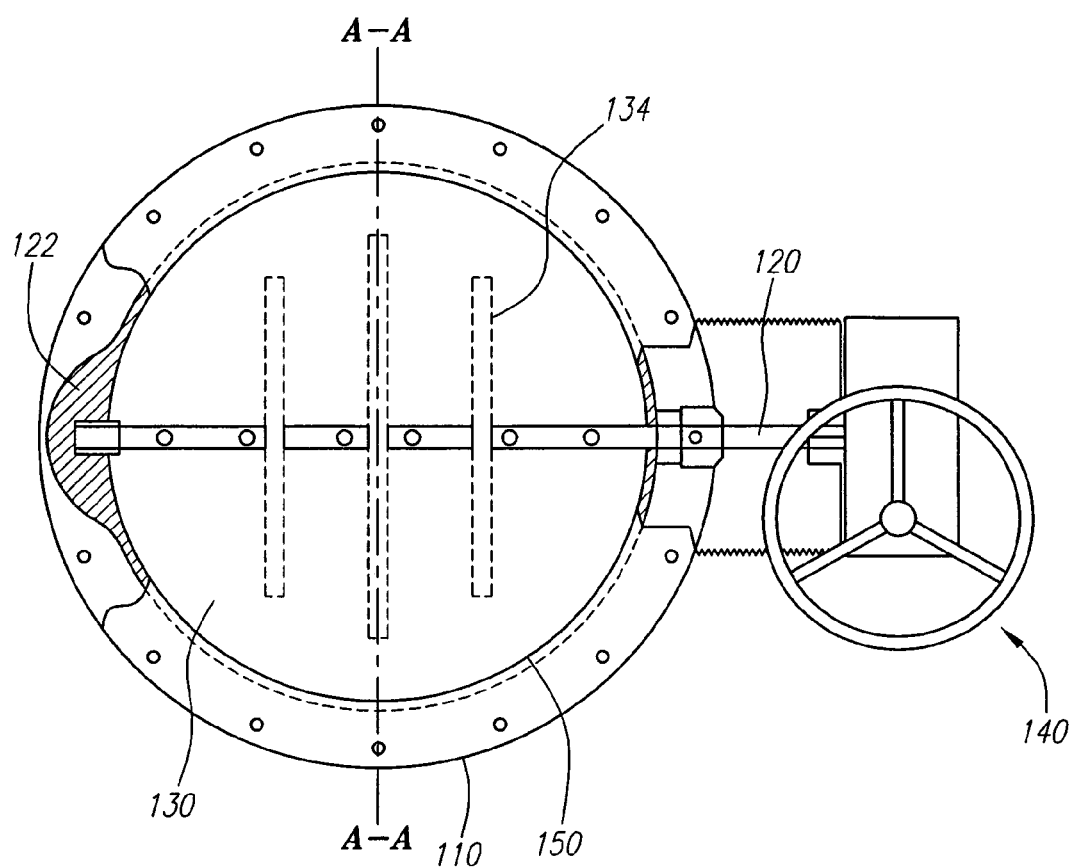
FIG. 2 is a cross-sectional view of an isolation damper according to one embodiment.

Referring to FIGS. 1 and 2, according to one embodiment, an isolation damper 100 includes an annular frame or body 110, a shaft 120, a damper blade 130 that is coupled to the shaft 120, an actuator 140 to drive the shaft 120 and the blade 130 coupled thereto, and a flexible seal member 150, such as an annular strip 150 or a gasket, which is at least partially embedded within the annular frame 110. The flexible seal member 150 is embedded within the annular frame 110 so that the flexible seal member 150 extends around the inner annular surface 114 of the frame 110.

When the damper 100 is open, the outer circumferential edge 132 of the blade 130 does not contact the flexible seal member 150 (except for possibly minimal contact between the blade 130 and flexible seal member 150 near the ends of the shaft 120). When the blade 130 is rotated to close the damper 100, the outer circumferential edge 132 of the blade 130 rotates towards the frame 110. As the blade 130 is rotated further, the outer edge 132 of the blade 130 engages a central, exposed portion of the flexible seal member 150 to form a seal. The seal can be an airtight or zero-leakage seal so that the airflow through the damper 100 is completely blocked when the damper 100 is closed. This is particularly useful when the damper 100 is used to control hazardous airflows and in environments that require accurate control over airflows.

In one embodiment, the blade 130 is a unitary body and can be, for example, fiberglass reinforced plastic, such as resin, e.g., a vinyl ester resin. The blade 130 can have diameters ranging from about 4" to 120". Indeed, the size of the blade 130 will depend on the size of the damper 100 and/or the particular airflow control application.

Further, according to one embodiment, the blade 130 has an elliptical shape. In other words, sections of the blade 130 are longer or wider than other shorter or narrower sections. For example, according to one embodiment, the "top" and "bottom" blade sections 135 and 136 are larger or wider than sections 137 and 138 near the shaft 120. Thus, the width of the blade from end to end along the shaft or in the "x" or horizontal direction is shorter than the width of the blade along the "y" or vertical or perpendicular direction.

Figure 3:
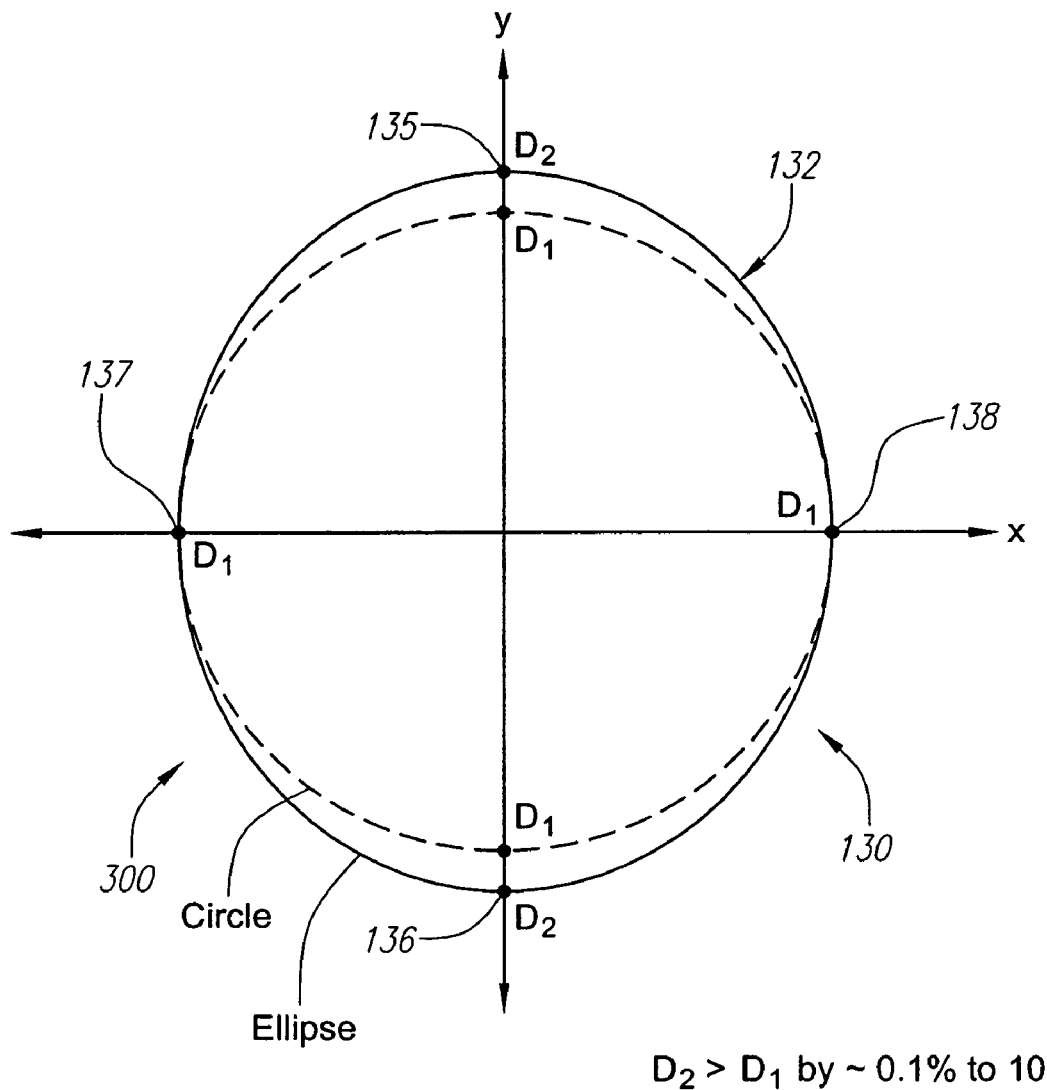
FIG. 3 generally illustrates an elliptically shaped blade according to one embodiment.

Referring to FIG. 3, the degree of ellipticity 300 of the blade 130 can be selected so that sections of the blade having the longest dimension along the "y" direction measured from the center of the blade 130 is about 0.1% to 15% longer than the shortest blade section measured along the shaft in the "x" direction from the center of the blade 130. The ellipticity 300 may vary depending on a particular damper design. A blade 130 having an elliptical shape prevents the blade 130 from being over-rotated, thereby eliminating the need for a backstop that is used in known dampers. The entire outer blade edge 132s, however, engages the flexible seal member 150 to form an air tight or zero-leakage seal.

The annular frame 110 defines an inner annular aperture or duct 112. The flexible seal member 150 can be a strip or gasket that is placed around an inner annular surface 114 of the frame 110. More particularly, at least a portion of the flexible seal member is advantageously embedded within the annular frame and a portion, e.g., a central portion, of the flexible seal member is exposed to engage the outer edge of the blade 130. The shaft 120, such as a stainless steel shaft, extends partially or completely diametrically across the inner annular aperture 112 between an encapsulating hub 122 and an actuator 140. One end of the shaft 120 opposite of the actuator 140 is rotatably secured within the encapsulating hub 122. In one embodiment, the hub 122 is a Teflon® bearing. Other suitable materials may also be utilized.

One exemplary actuator 140 that is used to rotate the shaft 120 is a manual actuator that includes a worm gear 142 that is driven by a handwheel 144. Turning the handwheel 144 drives the worm gear 142 which, in turn, rotates the shaft 120 and the blade 130 attached thereto. Automatic actuators can also be used and may be suitable in instances where the damper is not readily accessible. The blade 130 can be rotated between an open position and a closed position with the actuator 140. FIG. 1 illustrates the blade 130 between open and closed positions to show the details of the flexible seal member 150. If necessary, the blade 130 can include one or more stiffening members 134 so that the shape of the blade 130 is maintained and does not flex when it is rotated.

Figure 4:
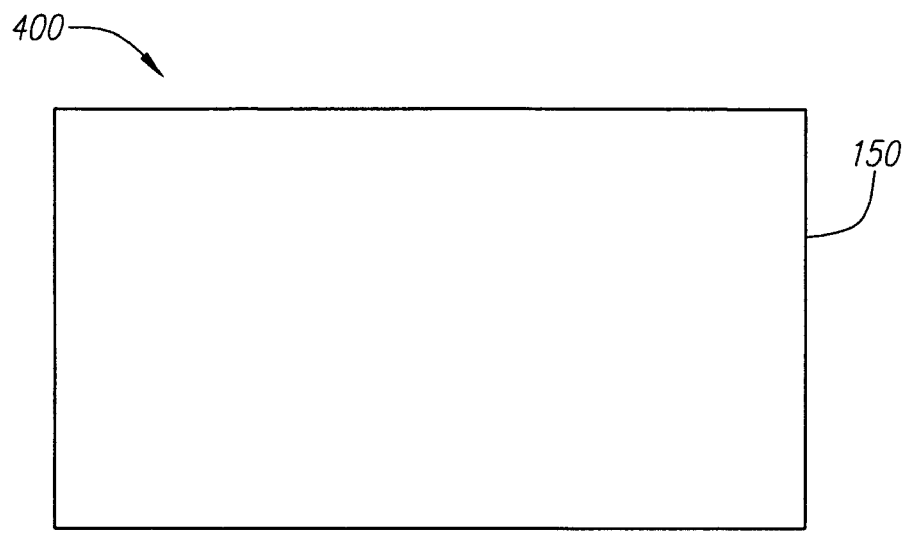
FIG. 4 generally illustrates a flexible sealing member in a relaxed or in a compassed state when the damper is open.
Figure 5:
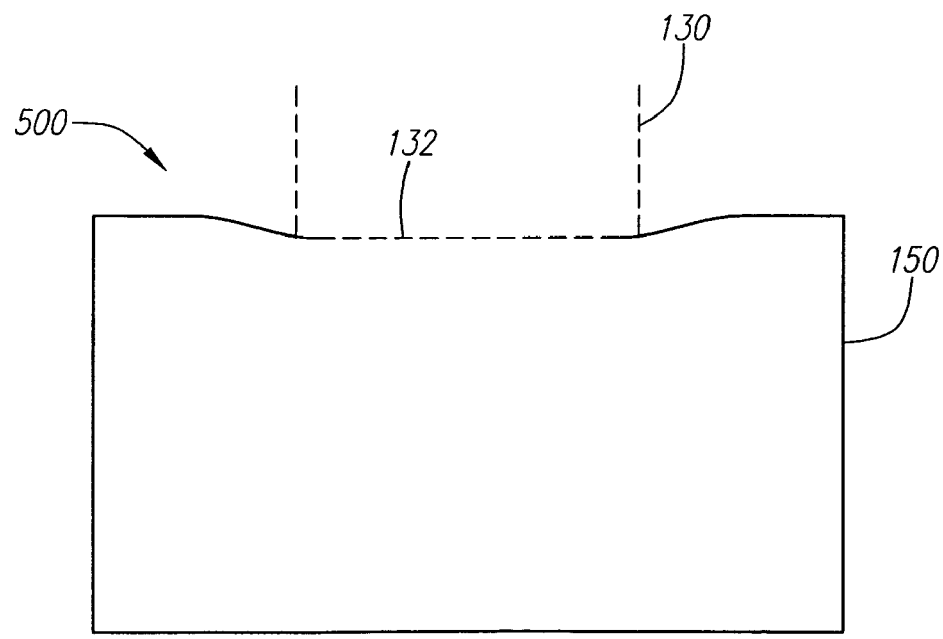
FIG. 5 generally illustrates a flexible sealing member in a compressed or deformed state when the damper is closed.

When the blade 130 is rotated to the closed position, the outer circumferential edge 132 of the blade 130 sealingly engages a central portion of the flexible seal member 150. As generally illustrated in FIGS. 4 and 5, the central portion of the flexible seal member 150 is resilient so that it is initially in a relaxed or uncompressed state 400 when the damper is open, and compressed 500 when the damper is closed. As the damper is closed, the blade edge 132 moves laterally along the top surface of the flexible seal member 150, which comes to rest on the flexible seal member 150 to form a seal. As a result of the flexible and compressive attributes of the flexible seal member 150, sections of the flexible seal member 150 that do not contact the blade edge 132 may be in the relaxed or semi-relaxed state 400, whereas sections of the central portion of the seal 150 hat contact the edge 132 of the blade 130 are compressed 500. Thus, when the damper 100 is closed, portions of the flexible seal member 150 immediately adjacent the edge 132 of the blade 130 are compressed, whereas other portions that are not compressed and may surround or envelope the blade edge 132, thereby forming an effective seal around the entire edge 132 of the blade 130 to block all air flow.

Figure 6:
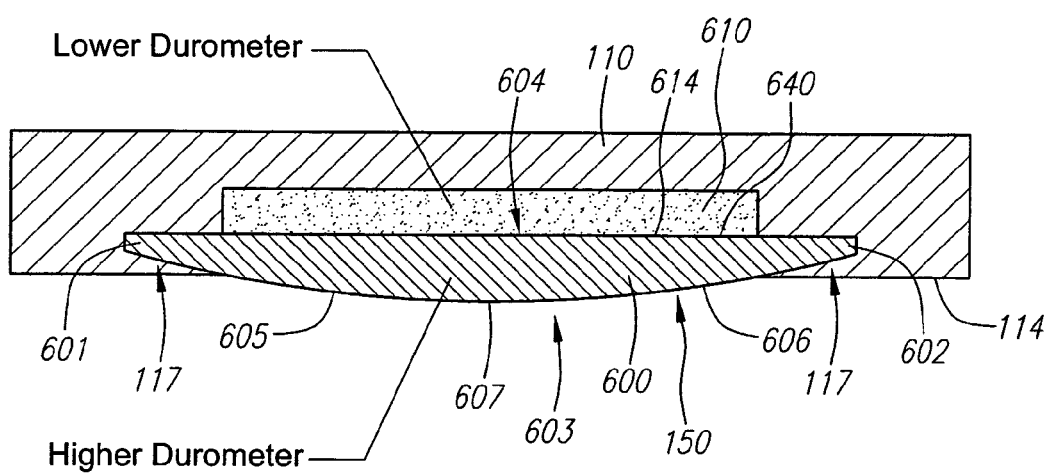
FIG. 6 is an exploded cross-sectional view of a multi-component flexible seal member integrated within a damper frame.

The hand wheel 144 is rotated in the opposite direction to rotate the shaft 120 and open the duct 112. In doing so, the outer edge 132 of the blade 130 moves back across the seal member 150, thereby disengaging and de-compressing the seal 150 and, in turn, allowing airflow through the duct 112. When the blade 130 is moved to open the damper 100, the flexible seal member 150 exhibits is resiliency and returns to its original relaxed shape 400. Persons skilled in the art will appreciate that the flexible seal member 150 can have different characteristics and dimensions to be adapted to different damper configurations. Referring to FIG. 6, according to one embodiment, the flexible seal member 150 include multiple components. FIG. 6 is a cross-sectional view (not necessarily to scale) along line A-A of FIG. 2 through the frame 110, at the top of the A-A cross-section. In the illustrated embodiment, the flexible seal member 150 includes a first or "outer" seal component 600 and a second or "inner" or "embedded" seal component 610. In the context of FIG. 6 and relative to the frame 110, the "inner" component 610 is embedded inside the frame 110, and the "outer" component 600 has a surface that is exposed to the environment and, in addition, portions that are embedded within the frame 110. The "outer" component 600 is closer to the interior aperture 112 of the frame 110.

More particularly, the outer component 600 is partially embedded in the frame 110 and a portion of the outer component 600 is exposed and extends around an inner periphery of the frame 110. In the illustrated embodiment, a central portion 603 of the outer component 600 is exposed and extends or protrudes beyond the inner surface 114 of the annular frame 110. The inner component 610 is completely embedded within the frame 110 and is covered by the outer component 600. Thus, in the embodiment shown in FIG. 6, no portion of the embedded component 610 is exposed.

The flexible seal member 150 that is at least partially embedded within the frame 110 can be made using known elastomer formulating steps and techniques, which may include vulcanization, mixing, baking, gluing, pouring, extrusion, pultrusion and/or adhesion. According to one embodiment, the outer and embedded components 600 and 610 are composed of the same material and have the same thicknesses. The embedded component 610 can be compressed. Further, the ends 601 and 602 are designed to be compressed and to "snapped" into grooves 117 formed in the fiberglass frame 110. With this configuration, both the outer and embedded components 600 and 610 are secured within the annular frame 110. Indeed, various embedded and exposed seal member component shapes and sizes can be used as necessary to provide "snap in" or locking capabilities and a flexible seal.

A central portion 603 of the outer component 600 protrudes through an aperture formed in the annular frame 110. Thus, the central surface 603 is exposed to the environment. As shown in FIG. 6, the central exposed portion 603 expands or protrudes outwardly (e.g., in a mushroom-like manner) through the aperture formed in the frame 110 as a result of forces from the compressed ends 602 of the outer member 600 and the embedded member 610, which push against the central portion 603. The central portion 603 is uncontained by the body of the annular frame 110 relative to embedded component 610 and the embedded ends 601 and 602 of the outer member 600. As a result, the central portion 603 bulges or is pushed outwardly into a slightly arcuate or curved shape. The thickness of the outer component 100 is a maximum at a midpoint 607, and the height of the exposed central section 603 of the outer component 600 varies along its width.

According to one embodiment, the embedded surface 604 of the outer component 600 is flat to engage a flat surface 614 of the embedded component 610. Persons skilled in the art will appreciate that other configurations and interfaces between components 600 and 610 can be used to provide forces that push the central portion 603 beyond the inner surface 114 of the annular frame 110. For example, one or both of the surfaces 604 and 614 can be arcuate or have other non-linear shapes. Thus, the arrangement shown FIG. 6 is provided as one example in a non-limiting manner.

The first and second seal components 600 and 610 can be composed of the same or different materials. According to one embodiment, the outer component 600 is an elastomer, such as silicone. Other suitable materials include hypalon, EPDM, Viton, neoprene, and combinations thereof. The embedded component 610 can also be an elastomer, such as silicone. The outer and embedded components 600 and 610, whether the same or different materials, can have different characteristics. For example, the outer component 600 can have a durometer value or hardness that is greater than the durometer value or hardness of the embedded component 610. For example, the outer component 600 can have durometer values ranging from about 60 to about 90, whereas the embedded seal component 610 can have durometer values ranging from about 20 to about 50. This specification refers to durometer values according to ASTM specification, D2240-04e1 Standard Test Method for Rubber Property-Durometer Hardness.

The outer component 600 preferably provides a harder finish or outer surface than the embedded component 610 since the exposed central portion 603 of the outer component 600 contacts the circumferential edge 132 of the blade 130 when the damper is closed. Further, the outer component 600 is preferably resistant to corrosion and puncture since it contacts the blade 130. The outer component 600 also preferably has greater lubricity than the embedded component 610 to allow the blade 300 to move across the central portion 603 of the outer component 600 more easily and without undue friction.

The embedded component 610, on the other hand, is preferably softer and more porous than the outer component 600 to provide a degree of flexibility or a "cushion" or "pillow" with certain memory characteristics for assuming relaxed and compressed states 400 and 500. For example, with a frame 110 having a thickness of about ¾", the seal 150 can have various thicknesses, e.g., of about ¼" to about 4.0". A thickness of the embedded component 610 can be from about ¼" to about 3¹⁵⁄₁₆", and a thickness of the outer component 600 can be from about ¹⁄₁₆" to about 3¾", with a maximum height at the midpoint 617. A thickness of the flexible seal member 150 can be compressed from about 1% to about 95% of its original thickness with this dimensions. The thickness depends on, for example, the size and thickness of the frame 110 and the configuration of the blade 130. These compression attributes have been determined to provide an effective airtight seal.

Thus, the flexible seal member 150 can contact blade edges 132 to form a seal while, at the same time, allowing the flexible seal member 150 to form around the blade edges 132 to form an airtight seal. For example, damper embodiments can produce a zero Cubic Feet per Minute (CFM) leakage rate airtight seal that can withstand a minimum pressure of 30 inches w.g. Leakage rates were tested using Air Movement and Controls Association (AMCA) D 500 test procedures.

Referring again to FIG. 1, the flexible seal member 150 that extends around the entire inner periphery 114 of the frame 110 can have various dimensions. For example, the seal member 150 can be about ½" to about 12 in width and cover about 10-90% of the inner surface 114 of the frame 110, which has a width of about 6" to about 18". Thus, the flexible seal member 150 and can cover various portions of the inner surface 114 with different damper sizes and seal configurations. In the illustrated embodiment, the flexible seal member 150 is applied along a mid-section of the inner surface 114 of the frame 110, and the width of the seal member 150 is substantially constant.

Figure 7:
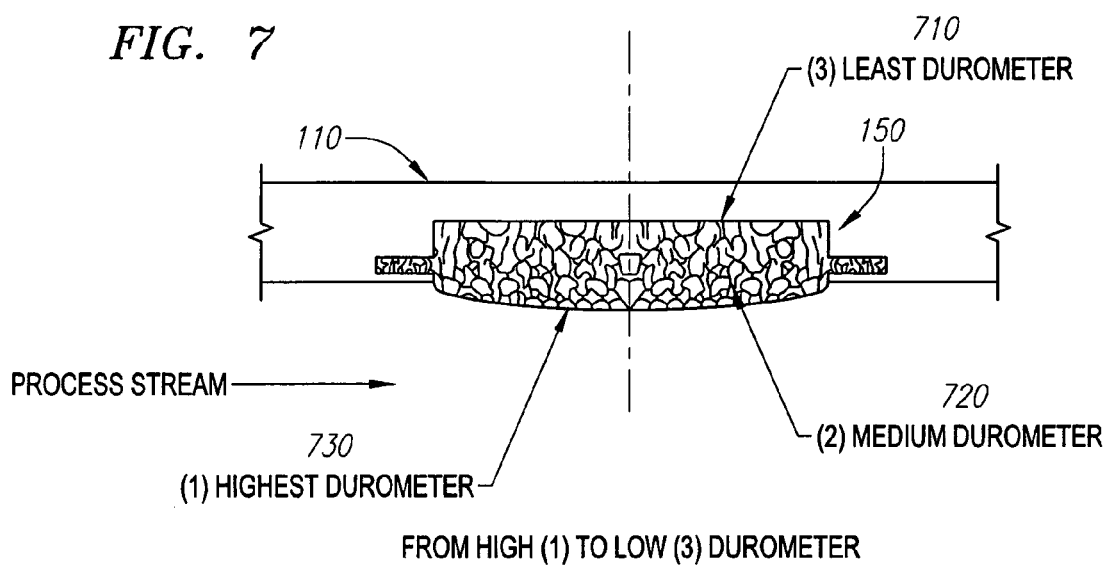
FIG. 7 illustrates a single component flexible seal member that is integrated within a damper frame and having graduated durometer values according an alternative embodiment.

Referring to FIG. 7, in an alternative embodiment, the flexible seal member 150 is a single component 700. In the illustrated embodiment, the durometer of the flexible seal material varies between minimum and maximum values 710 and 730. More particularly, the durometer value of the section of the flexible seal member 150 that is completely embedded in the frame 110 has a minimum value so that the material is more flexible or spongy, and the flexible seal member 150 material has a higher or intermediate durometer value between the embedded section and the outer surface. Exemplary seal materials that can have varying durometer values include silicone, hypalon, EPDM, Viton, neoprene, and combinations thereof.

The flexible seal member 150 material has a maximum durometer value 730 at the exposed surface so that the exposed surface is puncture resistant and has a more lubricious surface. According to one embodiment, the embedded material can have a durometer value of about 20, and the exposed portion can have a durometer value of about 90. The intermediate sections can have durometer values that vary between these two values. Indeed, various other durometer values can be utilized.

In the embodiment shown in FIG. 7, the durometer values vary gradually. Durometer values can vary in different manners depending on the thickness of the component and the desired flexibility and compression effects, e.g., linearly, exponentially and in other manners. In an alternative embodiment, the durometer values may vary in distinct steps or intervals, e.g., when a flexible seal member is composed of different materials. For example, the durometer value across the thickness of the seal component can be graduated so that the component 700 has different durometer intervals. Further, durometer values may change across one section and remain substantially constant across another section. The manner in which the durometer values vary can depend on the component 700 material and the manner in which the component 700 is produced.

Figure 8:
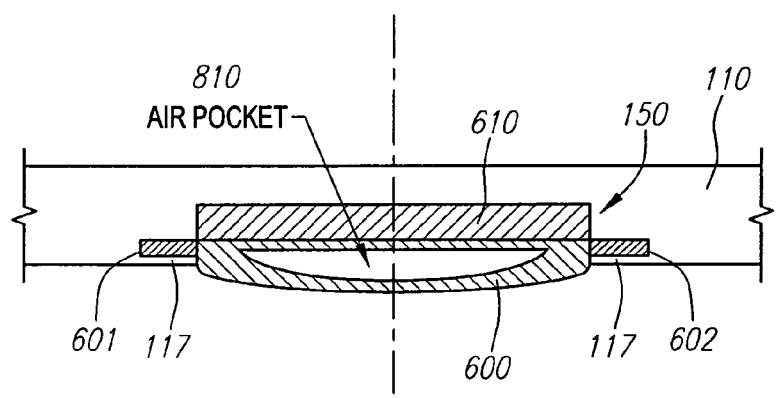
FIG. 8 illustrates a flexible seal component having an air cushion or pocket according to another embodiment.
Figure 9:
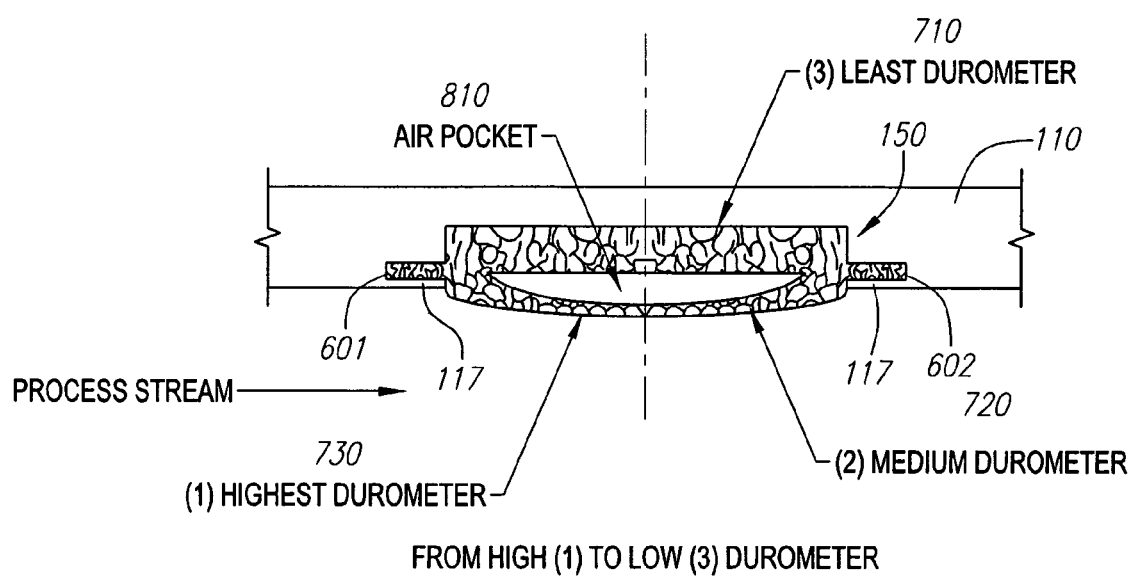
FIG. 9 illustrates a single component flexible seal member that is integrated within a damper frame and having graduated durometer values and an air pocket according to a further alternative embodiment.

Referring to FIG. 8, according to another embodiment, the flexible seal member 150 can include an air cushion or pocket 810. The air cushion can be at a pressure of about 10 pounds per square inch (psi). The particular air pressure can be selected to provide desired compression attributes. In the illustrated embodiment, the flexible seal member 150 is a two component member having an outer component 600 and an embedded component 610. The air pocket 810 is included within the outer component 600. The air pocket can provide further control over the flexibility of the seal member 150. FIG. 9 illustrates a further alternative embodiment, the flexible seal member 150 is composed of a material having varying durometer values and includes an air pocket 810.

Figure 10:
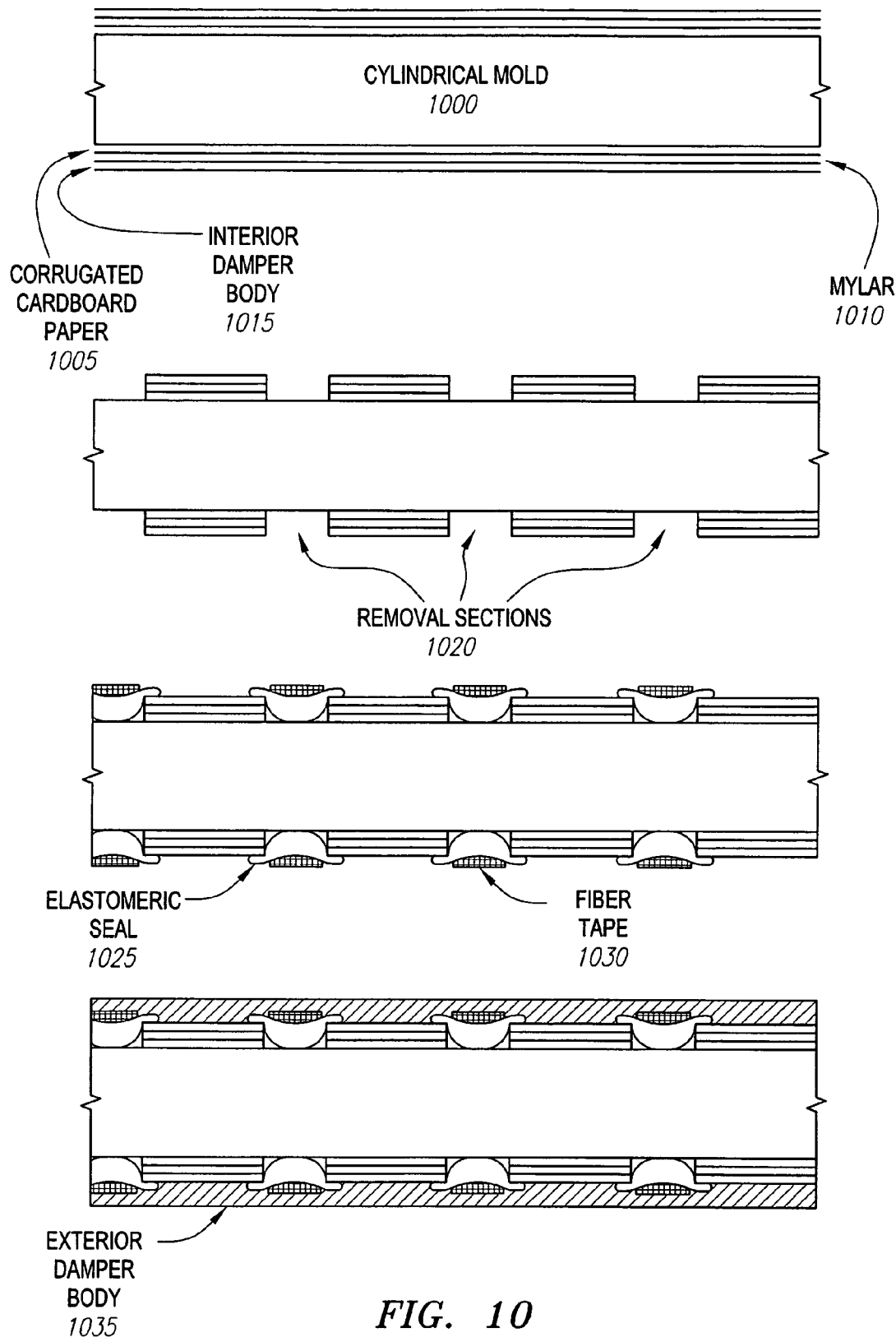
FIG. 10 illustrates an embodiment of a method of making an isolation damper having a flexible seal member that is at least partially embedded within the body of the damper frame.

The outer and embedded components can be installed individually or combined together and then installed using various known fabrication steps and additional steps to embed the flexible seal member within the frame. FIG. 10 generally illustrates a method of making an isolation damper having a flexible seal member that is at least partially embedded according to one embodiment.

In the embodiment shown in FIG. 10, a method of making isolation dampers having an elastomeric flexible seal member includes the steps of preparing a mold, creating a corrosion liner/interior damper body, preparations to embed the flexible seal member, embedding at least a portion of the flexible seal member, forming the exterior of the damper body or frame, and de-molding and separation. These steps are explained in further detail below with reference to FIG. 10.

Initially, a cylindrical mold 1000 having a diameter that is suitable for a desired damper diameter is mounted on a filament winding machine. Layers of corrugated cardboard paper 1005 are wound around the mold to act as a spacer, which allows the elastomeric flexible seal member to protrude inwardly of the damper body. A layer of Mylar or another suitable plastic film 1010 is wound around the mold to create a smooth interior fiberglass surface and to aid in de-molding.

A catalyzed resin is sprayed onto the prepared mold to wet the mold surface. A fiberglass or synthetic surface veil is wound around the mold and saturated with the catalyzed resin, and is rolled out. An appropriate number of layers of fiberglass mat material are wound around the mold to create the rest of the interior damper body 1015 and is allowed to cure and harden.

Two to eight inch removal sections 1020 are measured and marked at appropriate intervals based on the damper diameter. An appropriate saw or other cutting tool is used to cut through the interior damper body to remove the sections as marked. Any corrugated cardboard paper that remains on the mold within the removal section can be removed with a utility knife or other cutting tool. As a result, the mold surface is now exposed at the removal sections, which act as a mold and harbor the elastomeric seal.

Elastomeric seal material 1025 is cut to appropriate length required to wrap around the entire removed section of the interior damper body. The width of the seal is based on the damper size and is designed to overlap about two to six inches beyond the removal section and onto the interior damper body. The elastomeric seal is wrapped around the removed section of the interior damper body and forms a butt type joint. Fiberglass or synthetic mesh tape 1030 (e.g., drywall tape) is wrapped several times around the elastomeric seal in order to compress and hold the seal in place. This tape is wound tightly to fully compress the seal prior to building up the exterior damper body 1035. This process is repeated for all of the removed sections along the entirety of the mold.

The exterior damper body 1035 is created by wrapping fiberglass mat around the entire mold, covering all interior damper body and elastomeric seal areas completely. The mat is saturated with catalyzed resin and rolled out. The filament-winding and/or contact-molding process is initiated to create the exterior damper body per acceptable pipe and/or duct standards. The exterior damper body is built up until the required wall thickness for the damper body is achieved. The fiberglass reinforced plastic is allowed to cure.

Prior to de-molding, the entire length of the exterior damper body is marked at appropriate intervals, e.g., between 8-12" depending on damper diameter. This distance is the axial length of each damper from end to end. The elastomeric seal portion is preferably centralized within the length of these marks so that the seal is in the center of the damper lengthwise. At this point, there is one single fiberglass part consisting of inner and exterior damper bodies, and multiple elastomeric circumferential seals. This single part is cut into segments to create individual damper bodies. The entire marked part is removed from the mold. The entire part is then detailed, which includes sanding the exterior surfaces, and cut along the marked lines drawn in previous steps on the exterior damper body, thereby creating multiple segments. The segments are individual damper bodies that include a flexible seal member that is at least partially embedded within the frame, and the segments are ready to be flanged. Persons skilled in the art will appreciate that other process steps and techniques can be used. Embodiments using a flexible seal member provide a number of advantages relative to known damper seals. For example, by embedding and restraining a continuous elastomer seal member within a frame rather than relying on a seal member of a damper blade, the seal components are securely fastened within the annular frame, increasing the longevity and reliability of the flexible seal member. Further, embodiments fasten the flexible seal member in a damper frame in such a manner that adjustments, replacements and maintenance are eliminated or significantly reduced. Further, it is not necessary to cut the damper blade to extremely precise tolerances since the flexibility of the seal member allows various blade tolerances to be utilized. It is also not necessary to use conventional blade stop or a seal that is attached to a blade since embodiments use an annular seal is embedded or integrated into the frame. Additionally, a compressed seal member as used in illustrated embodiments, has a wider protruding shape which, when coupled with the "forgiving" characteristics of the seal member, permit the blade to land and seat along a relatively large "sweet spot" on the seal member. The ellipticity of the blade prevents over-rotation of the blade while improving airflow. Further, embodiments provide improved sealing capabilities compared to known dampers which rely on rotational forces to apply lateral pressure and compared to gasketless sealing systems that use "metal on metal" seals.

Although references have been made in the foregoing description to various embodiments, persons skilled in the art will recognize that insubstantial modifications, alterations, and substitutions can be made to the described embodiments without departing from embodiments as recited in the accompanying claims. For example, embodiments can be applied to dampers of various sizes and that are used in various applications. Further, the seal member can comprise different numbers of components and the same or different materials. The components can have different characteristics and be appropriately positioned and mounted to provide the desired sealing effects.

What is claimed:

1. An isolation damper capable of forming a seal, comprising:
   an annular frame that defines an inner aperture and has an inner annular surface;
   a multi-component flexible seal member that is at least partially embedded within the annular frame and that extends around the inner annular surface of the annular frame, wherein the flexible seal member is an elastomer, and wherein the flexible seal member is fixed in position relative to the annular frame such that the flexible seal member is incapable of translation relative to the annular frame, and wherein the multi-component flexible seal member includes:
   a first seal component; and
   a second seal component,
      wherein a durometer value of the first seal component is greater than a durometer value of the second seal component, and
      a shaft that extends across the inner aperture of the annular frame; and
   a blade that is coupled to the shaft and that is rotatable between open and closed positions,
   wherein the second seal component is embedded within the annular frame, the first seal component covers the second seal component, is partially embedded in the annular frame, and has an exposed surface for contacting the blade;

wherein an outer circumferential edge of the blade sealingly engages the flexible seal member when the blade is in the closed position, thereby forming the seal; and wherein the annular frame further defines a first groove toward a first end of the inner annular surface and a second groove toward a second end of the inner annular surface, a first portion of the seal member being positioned within the first groove and a second portion of the seal member being positioned within the second groove.

2. The damper of claim 1, wherein the outer circumferential edge of the blade compresses the flexible seal member when the blade is in the closed position.

3. The damper of claim 1, wherein the outer circumferential edge of the blade compresses the flexible seal member with increasing force as the blade is moved from a position in which the outer circumferential edge initially contacts the flexible seal member to the closed position.

4. The damper of claim 1, wherein the seal is zero leakage air-tight seal.

5. The damper of claim 4, wherein the zero leakage air-tight seal can withstand a pressure of about 30 w.g.

6. The damper of claim 1, wherein the elastomer is silicone.

7. The damper of claim 1, wherein the flexible seal member has a thickness of about ¼" to about 4".

8. The damper of claim 1, wherein the flexible seal member has a width of about ½" to about 12".

9. The damper of claim 1, wherein the width of the flexible seal member is substantially the same along the inner annular surface of the annular frame.

10. The damper of claim 1, wherein the flexible seal member is applied to a middle portion of the inner annular surface of the annular frame.

11. The damper of claim 1, wherein the flexible seal member covers about 10-90% of the surface area of the inner annular surface of the annular frame.

12. The damper of claim 1, wherein the flexible seal member can assume a relaxed state and a compressed state.

13. The damper of claim 12, wherein a central portion of the flexible seal member assumes the relaxed state when the damper is open and assumes the compressed state when the damper is closed.

14. The damper of claim 13, wherein a thickness of the flexible seal member in the compressed state is about 1-75% of the thickness of the flexible seal member in the relaxed state.

15. The damper of claim 1, wherein the blade is a unitary body.

16. The damper of claim 1, wherein the blade has an elliptical shape

17. The damper of claim 16, wherein the blade has an ellipticity of about 0.1% to about 10%.

18. The damper of claim 1, wherein the annular frame is free of a backstop.

19. The damper of claim 1, wherein a first edge of the flexible seal member is inserted into the first groove and a second edge of the flexible seal member is inserted into the second groove.

20. The damper of claim 1, wherein the outer circumferential edge of the blade sealingly engages a central portion of the first seal component when the blade is in the closed position.

21. The damper of claim 1, wherein the first seal component is wider than the second seal component.

22. The damper of claim 1, wherein the first seal component includes an air pocket.

23. The damper of claim 1, wherein the flexible seal member includes an air pocket.

24. The damper of claim 1, wherein the flexible seal member is resilient.

25. The damper of claim 1, wherein the first and second grooves are substantially collinear and open toward each other.

26. An isolation damper capable of forming a zero-leakage air-tight seal, comprising:

an annular frame that defines an inner aperture and has an inner annular surface;

a flexible multi-component seal member that is at least partially embedded within the annular frame, wherein the flexible seal member is an elastomer, and wherein the flexible multi-component seal member is fixed in position relative to the annular frame such that the seal member is incapable of translation relative to the annular frame, and wherein a durometer value of a first seal component is greater than a durometer value of a second seal component, and wherein the flexible seal member extends around the inner annular surface of the annular frame and that is capable of assuming a relaxed state when the damper is open and a compressed state when the damper is closed;

a shaft that extends across the inner aperture of the annular frame; and a blade that is coupled to the shaft and that is rotatable between open and closed positions, wherein an outer circumferential edge of the blade compresses and sealingly engages the flexible seal member when the blade is in the closed position, thereby forming the zero-leakage air-tight seal;

wherein the annular frame further defines a first groove toward a first end of the inner annular surface and a second groove toward a second end of the inner annular surface, a first portion of the seal member being positioned within the first groove and a second portion of the seal member being positioned within the second groove.

27. The damper of claim 26, wherein the outer circumferential edge of the blade compresses the flexible seal member with increasing force as the blade is moved from a position of the outer circumferential edge initially contacting the flexible seal member to the closed position.

28. The damper of claim 26, wherein the zero leakage air tight seal can withstand a pressure of about 30w.g.

29. The damper of claim 26, wherein the elastomer is silicone.

30. The damper of claim 26, wherein the flexible seal member covers about 10-90% of the surface area of the inner annular surface of the annular frame.

31. The damper of claim 26, wherein a thickness of the flexible seal member in the compressed state is about 1-75% of the thickness of the flexible seal member in the relaxed state.

32. The damper of claim 26, wherein the blade is a unitary body.

33. The damper of claim 26, wherein the blade has an elliptical shape.

34. The damper of claim 26, wherein the blade has an ellipticity of about 0.1% to about 10%.

35. The damper of claim 26, wherein the annular frame is free of a backstop.

36. The damper of claim 26, wherein the multi-component flexible seal member includes:

a first seal component; and a second seal component, wherein the second seal component is embedded within the annular frame, the first seal component covers the second seal component, and is partially embedded in the annular frame.

37. The damper of claim 36, wherein the outer circumferential edge of the blade sealingly engages a central portion of the first seal component when the blade is in the closed position.

38. The damper of claim 36, wherein the first seal component is wider than the second seal component.

39. The damper of claim 36, wherein the first seal component includes an air pocket.

40. The damper of claim 26, wherein the flexible seal member includes an air pocket.

41. The damper of claim 26, wherein the flexible seal member is resilient.

42. The damper of claim 26, wherein the first and second grooves are substantially collinear and open toward each other.

* * * * *